United States Patent
Williams et al.

(10) Patent No.: US 10,123,364 B2
(45) Date of Patent: Nov. 6, 2018

(54) PROCESSING NOTIFICATIONS RELATING TO TELECOMMUNICATION SESSIONS

(71) Applicant: METASWITCH NETWORKS LTD., Enfield (GB)

(72) Inventors: Matthew Williams, Enfield (GB); Andrew Caldwell, Enfield (GB)

(73) Assignee: METASWITCH NETWORKS LTD, Enfield, Middlesex (GB)

( * ) Notice: Subject to any disclaimer, the term of this patent is extended or adjusted under 35 U.S.C. 154(b) by 149 days.

(21) Appl. No.: 15/247,755

(22) Filed: Aug. 25, 2016

(65) Prior Publication Data
US 2017/0064772 A1    Mar. 2, 2017

(30) Foreign Application Priority Data
Aug. 28, 2015    (GB) .................................. 1515338.0

(51) Int. Cl.
| | |
|---|---|
| *H04W 4/00* | (2018.01) |
| *H04W 76/06* | (2009.01) |
| *H04W 68/00* | (2009.01) |
| *H04M 15/00* | (2006.01) |
| *H04W 76/38* | (2018.01) |
| *H04L 29/08* | (2006.01) |

(52) U.S. Cl.
CPC ......... *H04W 76/068* (2013.01); *H04M 15/41* (2013.01); *H04M 15/61* (2013.01); *H04W 68/005* (2013.01); *H04W 76/38* (2018.02); *H04L 67/142* (2013.01)

(58) Field of Classification Search
CPC .. H04W 76/068; H04W 68/005; H04L 67/06; H04L 67/142; H04M 15/41; H04M 15/61
See application file for complete search history.

(56) References Cited

U.S. PATENT DOCUMENTS

| | | | | |
|---|---|---|---|---|
| 5,524,280 | A * | 6/1996 | Douthitt ................ | H03J 1/0091 455/513 |
| 9,680,567 | B2 * | 6/2017 | Swanson ............ | H04B 10/0705 |
| 2009/0063315 | A1 | 3/2009 | Cai | |
| 2010/0311464 | A1 * | 12/2010 | Kelleher ............... | H03L 7/1976 455/552.1 |
| 2012/0059749 | A1 | 3/2012 | Sharma et al. | |

FOREIGN PATENT DOCUMENTS

| | | |
|---|---|---|
| WO | 2014008050 A1 | 1/2014 |
| WO | 2016069513 A1 | 5/2016 |

* cited by examiner

*Primary Examiner* — Steve D Agosta
(74) *Attorney, Agent, or Firm* — EIP US LLP

(57) ABSTRACT

Measures, including methods, systems and computer-readable storage mediums, for use in processing notifications relating to telecommunication sessions. A cluster of servers is operable to receive incoming notifications where each server can process any given notification and update a store holding records based on previous notifications. The cluster may include a timer function to allow records to be closed when no relevant notifications are received after a timeout interval.

14 Claims, 5 Drawing Sheets

PROCESSING NOTIFICATIONS RELATING TO TELECOMMUNICATION SESSIONS

CROSS-REFERENCE TO RELATED APPLICATIONS

This application claims priority under 35 U.S.C. § 119(a) to UK patent application no. GB 1515338.0, filed on Aug. 28, 2015, the entire content of which is hereby incorporated by reference.

BACKGROUND OF THE INVENTION

Field of the Invention

The present disclosure relates to generating digests of incoming messages. In particular, but not exclusively, the present disclosure relates to measures, including methods, systems and computer program products, for generating records based on incoming messages.

Description of the Related Technology

Tracking and charging for the use of services rendered is a very important task for providers of telecommunications networks. The IP Multimedia Subsystem (IMS) specification, on which most modern telecommunications networks providing telephony or other services are based, describes a Charging Data Function (CDF) which is an important part of the offline charging process in the network. With reference to FIG. 1, various IMS Service Elements (10, 10') such as S-CSCF and AS comprise Charging Trigger Functions (CTFs) (12, 12') which use the Diameter Rf interface (14, 14') to send ACcounting-Request (ACR) messages to the CDF 16. The CDF is responsible for generating Charging Data Records (CDRs) based on the received ACRs, and passes them to the Charging Gateway Function (CGF) 18 over the Ga Interface 20. The CGF is responsible for persistent storage of the CDRs and passing them to the Billing system 22 over the Bx interface 24. This access to the CDRs by the Billing system may be practiced via the CGF exposing an FTP directory containing the CDRs.

In the case of a simple (one-off) billable event, the CDF simply processes the ACR in order to form a CDR, which can then be stored by the CGF after transfer over the Ga interface as specified in 3GPP specification TS.32.295. However, the specification also supports the notion of billable sessions, where the CDF has to receive and compile multiple ACRs in order to form a CDR. Such a session might relate to a phone call, for example, where the charge might depend on the duration of the telephone call, as well as services invoked during that call, such as a transition to include video as well as audio media part-way through a call. Session-based billing is initiated by a START ACR; comprises a number of INTERIM ACRs; and finally is finished by a STOP ACR to indicate that the received ACRs should be compiled to form a CDR.

INTERIM ACRs are sent for a variety of reasons. One reason an ACR is sent is as a heartbeat to indicate the session is ongoing, and that the CDF should continue to bill for it. Another reason is to indicate changes in the session, such as the transition to include video mentioned above. These "heartbeat" ACRs are employed since the CDF cannot guarantee to receive the STOP ACR in the event of some types of failures, and so it should be able to finish billing at some point rather than indefinitely extend the charges for a session where the STOP ACR was not received. Termination of the session in this way is referred to as premature closure and results in a CDR being produced which records the session up to the point of closure.

These features of the Rf interface and the ACRs sent across it, in particular in relation to session-based billing, mean that implementing a CDF involves tracking the current state for each ongoing session, as well as maintaining a timer for each session to track whether the session should be prematurely closed.

It would be desirable to implement at least part of a CDF using modern, cloud-compatible software design paradigms, such as having a stateless cluster of nodes, each node being able to process any incoming ACRs regardless of whether that node has received previous ACRs associated with that session, the cluster being resilient to failure of one of the nodes. However, the state of ongoing sessions as well as the state of timers for each session makes this difficult.

SUMMARY

According to embodiments of the present disclosure, there is a method of handling incoming notifications at a cluster of servers, the notifications relating to ongoing telecommunication sessions, the method comprising: receiving a notification relating to an ongoing telecommunication session at a first server in the cluster; retrieving a session information record relevant to the ongoing telecommunication session from a first data store; updating the session information record to form an updated session information record, the updating taking place based on the contents of the notification; depositing the updated session information record in the first data store; determining that the time elapsed since receiving a notification relating to the ongoing telecommunications session has exceeded a timeout threshold; retrieving the session information record from the first data store; and marking the session information record as prematurely completed based on the determination to form a closed session information record.

In some embodiments, the method comprises creating a timer responsive to receiving the notification relating to an ongoing telecommunication session; and wherein the determining that the time elapsed has exceeded a timeout threshold comprises receiving a timer pop indicating that the timer has expired.

In some embodiments, the timer is created in a distributed timer service.

In some embodiments, the timer pop is received at a second server in the cluster.

In some embodiments, the method comprises depositing the closed session information record in the first data store.

In some embodiments, the method comprises depositing the closed session information record in a second data store suitable for long term storage and retrieval of the closed session information record.

In some embodiments, the second data store is a clustered, geographically distributed data-store.

In some embodiments, the method comprises receiving a second notification relating to the ongoing telecommunication session, retrieving the closed session information record relevant to the ongoing telecommunication session from the first data store; updating the closed session information record to form a further updated session information record, the updating taking place based on the contents of the second notification; and depositing the further updated session information record in the first data store.

In some embodiments, the method comprises depositing the further updated session information record in the second data store to replace the closed session information record.

In some embodiments, the timer's duration is based on the expected interval between successive notifications relating to the ongoing telecommunication session.

In some embodiments, the timer's duration is based on a parameter of the ongoing telecommunication session.

In some embodiments, the method comprises providing an FTP interface to data in the second data store.

In some embodiments, the incoming notifications relating to ongoing telecommunication sessions comprise diameter ACR messages for enabling charging for the ongoing telecommunication sessions.

In some embodiments, the session information record is a CDR.

According to embodiments of the present disclosure, there is a cluster of servers for handling incoming notifications relating to ongoing telecommunication sessions, the cluster of servers further comprising a first data store, each server in the cluster comprising at least one memory including computer program code and at least one processor in data communication with the at least one memory, wherein the at least one processor is configured to receive a notification relating to an ongoing telecommunication session; retrieve a session information record relevant to the ongoing telecommunication session from the first data store; update the session information record to form an updated session information record based on the contents of the notification; deposit the updated session information record in the first data store; determine that the time elapsed since receiving a notification relating to the ongoing telecommunications session has exceeded a timeout threshold; retrieve the session information record from the first data store; and mark the session information record as prematurely completed based on the determination to form a closed session information record.

According to embodiments of the present disclosure, there is a non-transitory computer-readable storage medium comprising computer executable instructions which, when executed by a processor, cause a computing device to perform a method of handling incoming notifications at a cluster of servers, the notifications relating to ongoing telecommunication sessions, the method comprising: receiving a notification relating to an ongoing telecommunication session at a first server in the cluster; retrieving a session information record relevant to the ongoing telecommunication session from a first data store; updating the session information record to form an updated session information record, the updating taking place based on the contents of the notification; depositing the updated session information record in the first data store; determining that the time elapsed since receiving a notification relating to the ongoing telecommunications session has exceeded a timeout threshold; retrieving the session information record from the first data store; and marking the session information record as prematurely completed based on the determination to form a closed session information record.

According to embodiments of the present disclosure, there is a cluster of servers acting as an IMS Charging Data Function, the cluster comprising: a plurality of control nodes; a distributed data store and a persistent data store; the cluster being operable to: receive incoming INTERIM ACRs relating to ongoing sessions, and update partial CDRs in the distributed data store based on the incoming INTERIM ACRs; determine when the partial CDRs have not been updated for longer than the Session Interval; prematurely close the partial CDRs responsive to the determination; and deposit the prematurely closed partial CDRs in the persistent data store.

Further features of the present disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Figure 1:
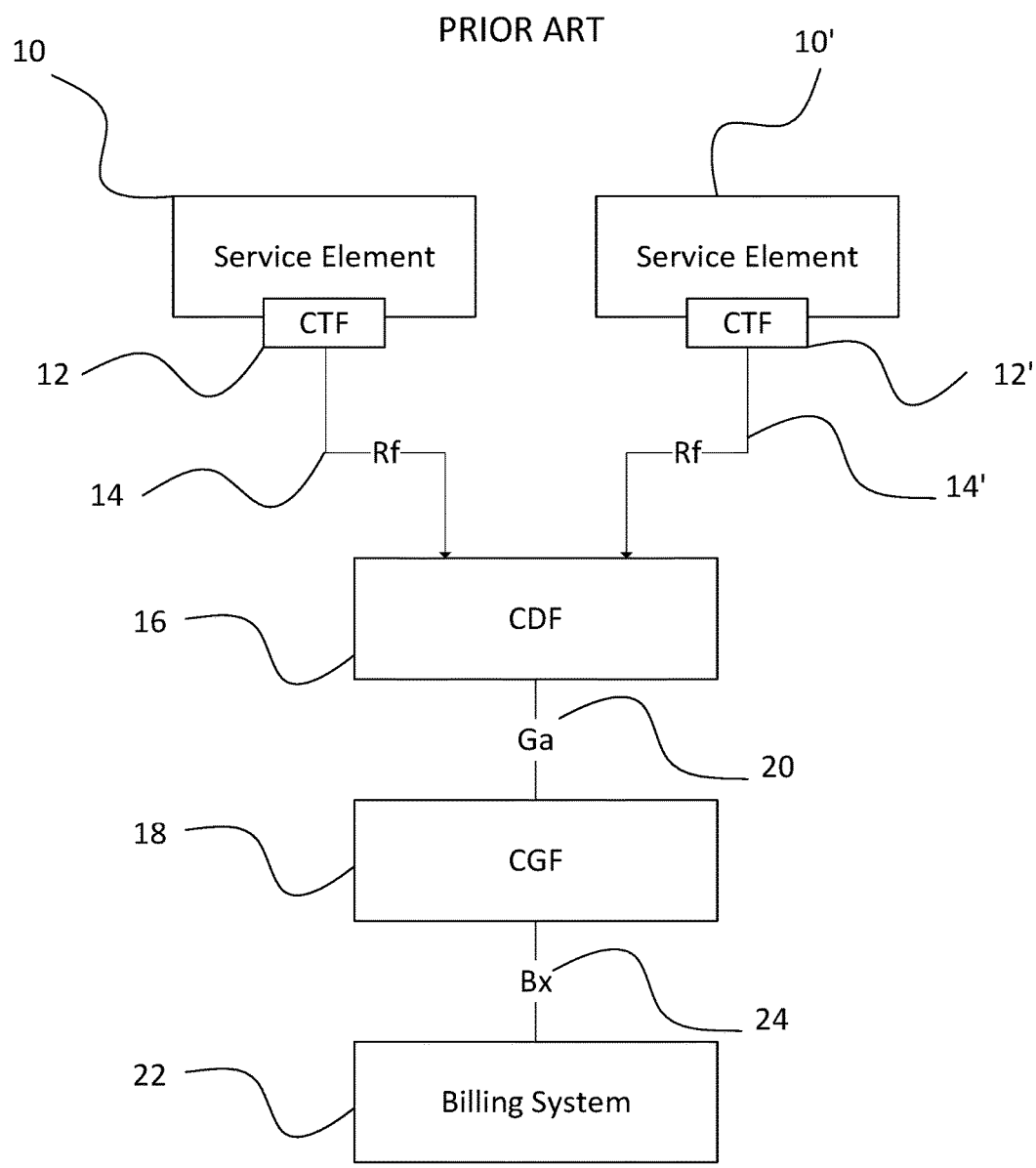
FIG. 1 shows a prior art IMS billing arrangement.

The present disclosure describes a network, collection or cluster of servers which act together to carry out at least portions of the IMS billing arrangement as shown in FIG. 1. For example, in one embodiment the cluster of servers may receive ACRs on the Rf Interface to form CDRs, performing the function of a CDF. The skilled man will realize that the servers which operate together may take the form of discrete physical machines; virtual machines operating on one or more hosts; Linux Containers or any other appropriate form for carrying out the processing described, in any combination. The term "server" is used in this disclosure to refer to any appropriate computer device, virtual or physical, capable of carrying out network operations and performing processing, comprising a processor, memory and network interface.

In order to operate in a manner particularly suitable for implementing in a cloud-based network, each server in the cluster should be able to serve any incoming request i.e. whilst the cluster as a whole serves the overall desired function; any particular server is capable of acting on behalf of the cluster. Requests can therefore be routed to the various servers in any convenient manner, such as IP multicast if they share IP addresses, or providing a load balancer distributing requests amongst them (for example). One particularly suitable method for routing requests to the servers is for the originators of the requests to simply distribute their requests amongst all available servers using round-robin load balancing.

Figure 2:
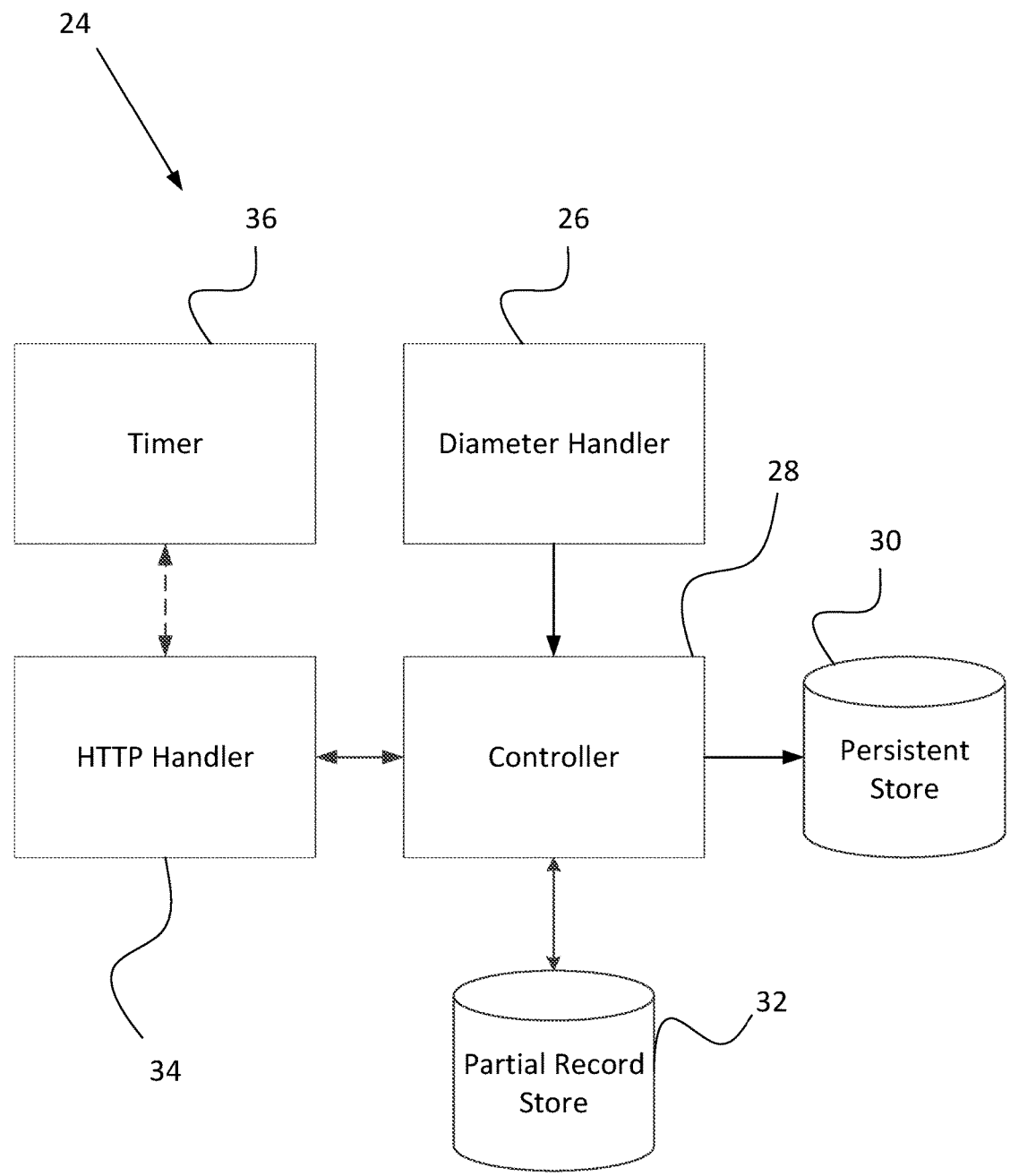
FIG. 2 shows a schematic view of the components of a server according to an embodiment.

Referring now to FIG. 2, a schematic view of components of a server 24 is shown in accordance with an embodiment of the present disclosure. In a typical deployment, a plurality of servers will run in a deployment, and together perform at least part of the function of a CDF. Server 24 has a Diameter handler 26, which listens to an appropriate port or ports to receive incoming ACRs and respond to them when appropriate. Diameter handler 26 may exist as a logically distinct entity to Controller 28, or be integrated into it as a logical whole (in which way it is represented in later figures for brevity).

Controller 28 is capable of handling incoming ACRs received by Diameter handler 26 and compiling them to form a CDR in the standard way according to 3GPP TS.32.298. Controller 28 has access to two forms of storage:

A Persistent Store 30 which is used for storage of completed CDRs, and a Partial Record Store 32 which is used for storage of partial CDRs for ongoing sessions. Both forms of storage are clustered storage, that is to say that they provide access to all of the records stored by any of the servers and distribute those records across the cluster to provide redundancy (and potentially distributed across sites to provide geo-redundancy). For example, Cassandra or other disk-based storage solutions such as Riak or MySQL are suitable for implementing Persistent Store 30, where it is important that the storage of the records is reliable. In some embodiments, such independent distributed stores are employed since they have already well solved the resiliency problems and so that aspect can be effectively offloaded. Alternatively, a suitably reliable non-clustered storage solution such as NAS may be suitable in some embodiments. For Partial Record Store 32, in one embodiment, a faster storage solution such as Memcached, Infinispan, Couchbase or Redis can be employed.

The skilled man will realize that in some embodiments, it may be possible to use the same clustered storage solution for both the Persistent Store 30 and Partial Record Store 32, for example using a high-performance clustered storage solution for both. This would be particularly appropriate when using Server 24 to perform only the functions of a CDF, and an interface to a CGF could be used to ensure persistent storage of the CDRs. It is appropriate, however, to use a disk-based storage solution for Persistent Store 30 as that allows server 24 to carry out functions of both a CDF and a CGF. For example, an FTP interface can be provided for access to Persistent Store 30 which would allow server 24 to provide an interface like the Bx interface as shown in FIG. 1, allowing server 24 (in addition to the other members of the cluster) to perform all the roles of a CDF and CGF. This FTP interface could comprise simple flat-file access to each CDR, or the CDRs could be further processed and grouped by time period etc.

Figure 3:
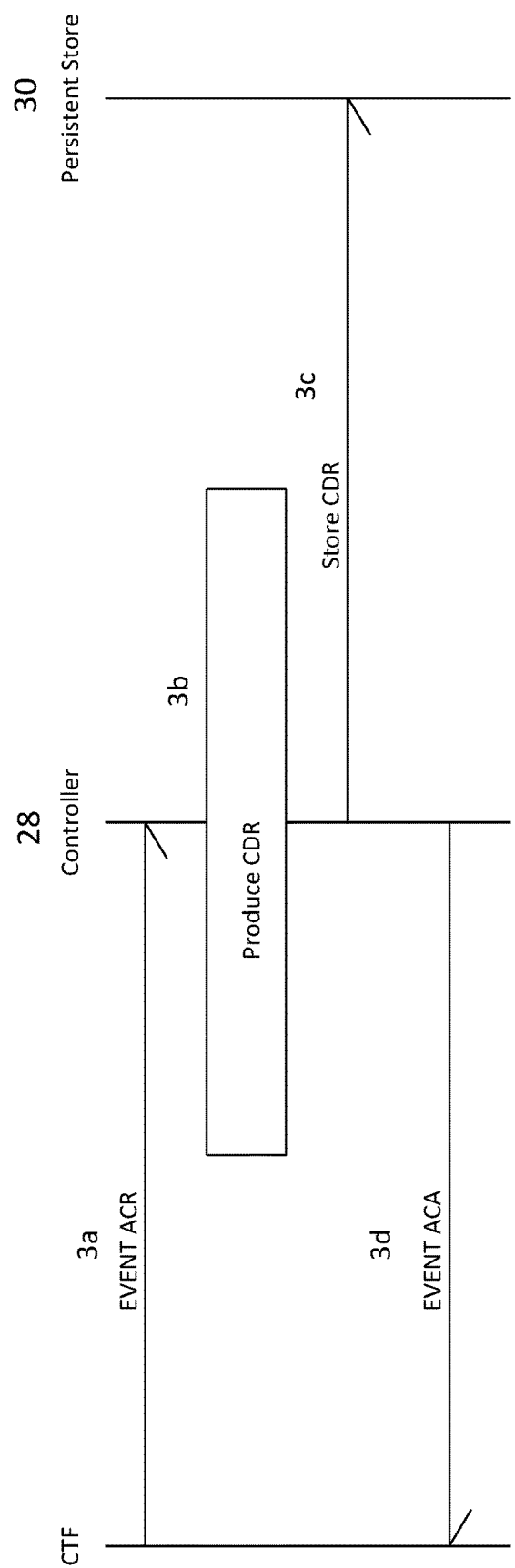
FIG. 3 shows a ladder diagram of transactions carried out to form a CDR for a billable event according to an embodiment.

With reference to FIG. 3, a simple event based ACR transaction is shown in ladder diagram form. At 3*a*, a CTF in the network sends an EVENT ACR to the cluster—and therefore this message ends up at a Server. This is received by Diameter handler 26 as described above, and complied to form a CDR at 3*b* before being sent to Persistent Storage 30 at 3*c*. At 3*d*, the ACR is acknowledged by an EVENT ACA (ACcounting Answer) message in the standard way. Whilst it is possible to acknowledge the ACR message earlier in the process, in some embodiments it is done after the CDR is logged in the Persistent store since a server failure before the event is logged will prevent the acknowledgement from being sent out. When a CTF does not receive an acknowledgement, the specification directs it to try to contact another CDF so billing for the event will be preserved.

Whilst event based ACRs are straightforward to process, even in a distributed cluster, this is not the case for ongoing sessions. In particular, as each ACR relating to an ongoing session is not guaranteed to be sent to the same server, each server in the cluster needs to be able to handle any incoming ACR to add to the partial CDR relating to the session so far. This is further complicated by the necessity of providing premature closure of a CDR relating to an ongoing session, since a server that had received an INTERIM ACR cannot be sure that a failure to receive a further ACR for that session indicates the CDR should be prematurely closed (instead, the ACR may have been directed to a different server). There is the added problem that it is still appropriate to provide for some manner of premature closure for the CDR so that when a CTF fails to send the STOP ACR the session is still terminated and billing does not continue indefinitely.

We address these issues by using a distributed timer service such as described in U.S. patent application Ser. No. 14/604,473. With reference again to FIG. 2, each server further contains an HTTP Handler or interface 34, which is operative to communicate with timer service 36 via a HTTP interface. This interface can be a Remote Procedure Call (RPC) style interface to provide for callbacks. The timer service 36 provides a reliable, distributed timer service that, after being provided with a name, duration and level of redundancy desired for a timer, implements that timer reliably (up to (redundancy—1) failures will not prevent the timer being triggered) and may provide a unique identifier that can be used to update or delete the timer. When the timer is triggered, the timer service carries out an HTTP callback (for example, an HTTP PUT or POST) to the HTTP handler 34. Since each server implements an HTTP interface 34, the callback will be directed to a server able to handle the callback. As with the Diameter Handler, HTTP Handler 34 may be a separate logical component to Controller 28 or be an integrated aspect thereof (in which way it is represented in later figures for brevity).

Figure 4:
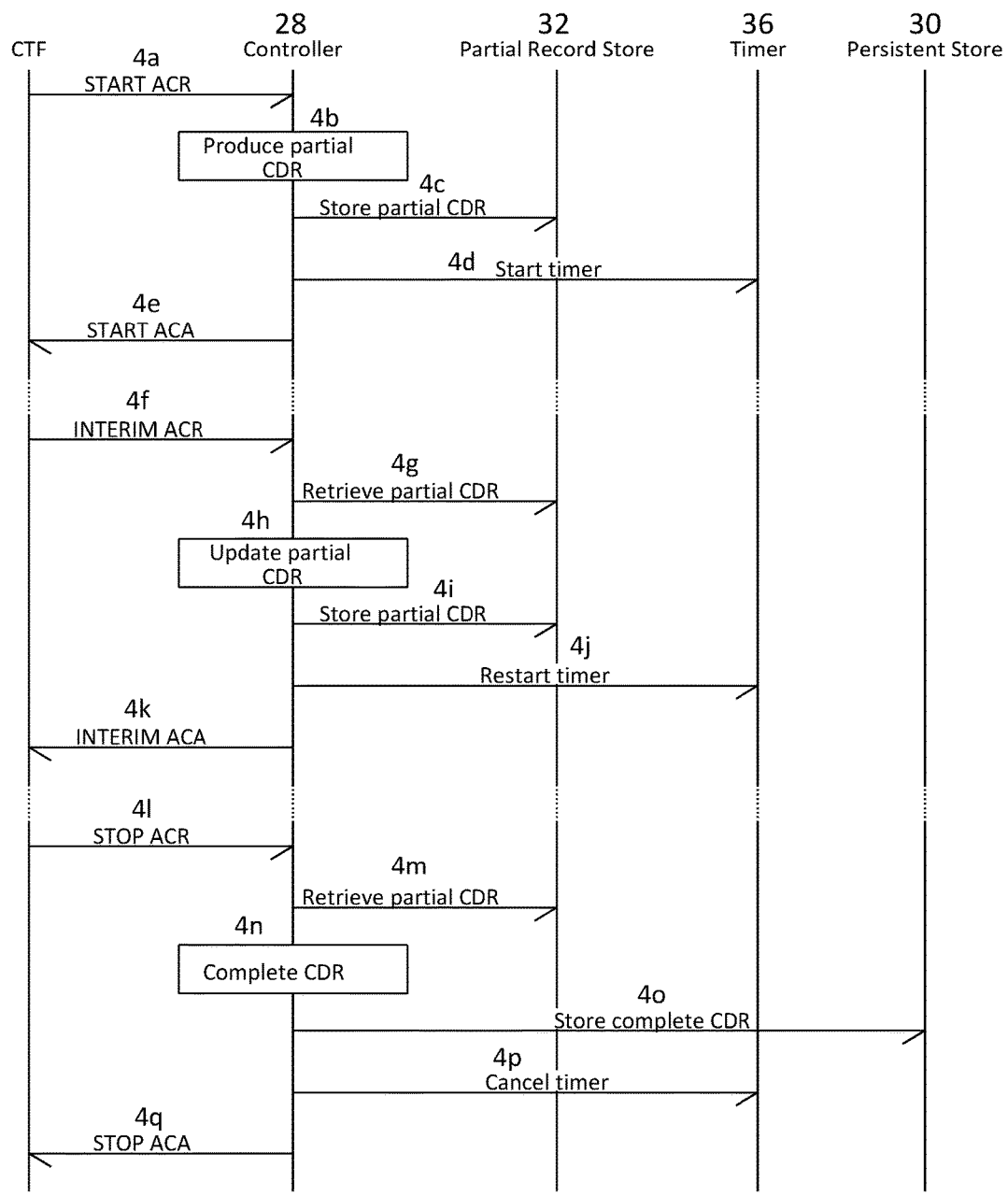
FIG. 4 shows a ladder diagram of transactions carried out to form a CDR for a billable session according to an embodiment.

Referring now to FIG. 4, we demonstrate how the timer allows the server to provide reliable handling of session based ACRs. At 4*a*, a CTF in the network sends a START ACR message to the cluster, and finds its way (as previously described) at Controller 28. Controller 28 produces a partial CDR based on that ACR at 4*b*. In some embodiments, this partial CDR is exactly that—the opening part of a CDR, filled in with the data obtained from the ACR. However, the skilled man will realize that any data structure containing the appropriate information from the ACR will be sufficient to eventually build a full CDR, and in the extreme case the "partial CDR" may be a simple record of the ACRs or segments thereof which involves further processing to form a CDR. In any case the partial CDR may also include other book-keeping information for later use.

At 4*c*, this "partial CDR" is stored in Partial Record Store 32. At more or less the same time as this, at 4*d* the Controller contacts timer service 36 to start a timeout timer for this session. Whilst some implementations of timer service 36 may require only a single message to be sent from Controller 28 to timer service 36, in other embodiments there may be a brief exchange of messages. In particular, this may involve Timer Service 36 indicating to Controller 28 a unique identifier for the generated timer to allow that timer to be updated or deleted. At 4*e*, an acknowledgement or START ACA is returned to the CTF. As previously described in relation to event based billing, whilst this message could be returned earlier in the process, in some embodiments it is done only once the message has been fully handled.

In the usual way as directed by the Rf Specification, the START ACA indicates to the CTF the session interval, which tells the CTF how frequently to send heartbeat INTERIM ACRs in order to keep the billing for that session open. This is configurable by the operator of the server, and may be based on a suggested session interval provided by the CTF on the ACR. In some embodiments, the timer created at step 4*d* is slightly longer than the session interval, so that the session is not kept open for substantially longer than the session interval after the last ACR for that session, but we do not prematurely close sessions very often due to the timer pop outracing an INTERIM ACR.

At some point later, but before the timeout interval indicated when creating the timer for this session, the CTF generates an INTERIM ACR to indicate the session is ongoing or to mark some type of change. This message is received by Controller 28 at 4f, which may be on the same server as received the START ACR at 4a or may be at a different server. In any case, the controller retrieves the partial CDR created thus far from Partial Record Store 32 at 4g (although in some embodiments it may have cached the partial CDR reducing the need for retrieval from the store in the case that the same server handles both the START and INTERIM ACR). The partial CDR is updated based on the received INTERIM ACR at 4h, and then the updated partial CDR is re-committed to the store at 4i.

As part of handling the incoming INTERIM ACR, the timer service 36 is updated as a heartbeat has been received and the session billing should be kept open again for the timeout period. This is depicted at 4j although the timer may instead be updated at any point during the handling of the incoming ACR. Restarting the timer may take the form of updating the existing timer by using the unique identifier generated by timer service 36 (which can be stored with or alongside the partial CDR in the store, and in some embodiments would be the diameter session ID which can be used as the key for the partial record store). Again, the final step of handling the INTERIM ACR is to reply with an acknowledgement at 4k (which again could be done at any point but in some embodiments is done once the message has been completely handled).

Finally, the session is terminated and the CTF sends a STOP ACR to the cluster at 4l. As described above, this is received by controller 28 on any of the servers in the cluster. At 4m, the partial CDR is retrieved from store 32 and finalized based on the incoming ACR at 4n. This may involve more or less processing depending on the manner in which the ACR has been compiled up to this point. Once the CDR is finished, it is sent to the Persistent Store 30 at 4o for later retrieval. Again, at some point in handling the ACR, the timer should be dealt with and in this case, since the CDR is finalized, the timer should be cancelled at 4p although again this may be achieved by marking the timer as to be ignored or some other appropriate technique. Finally, the STOP ACR is acknowledged at 4q which as before can be done at the end of the processing associated with the ACR.

Figure 5:
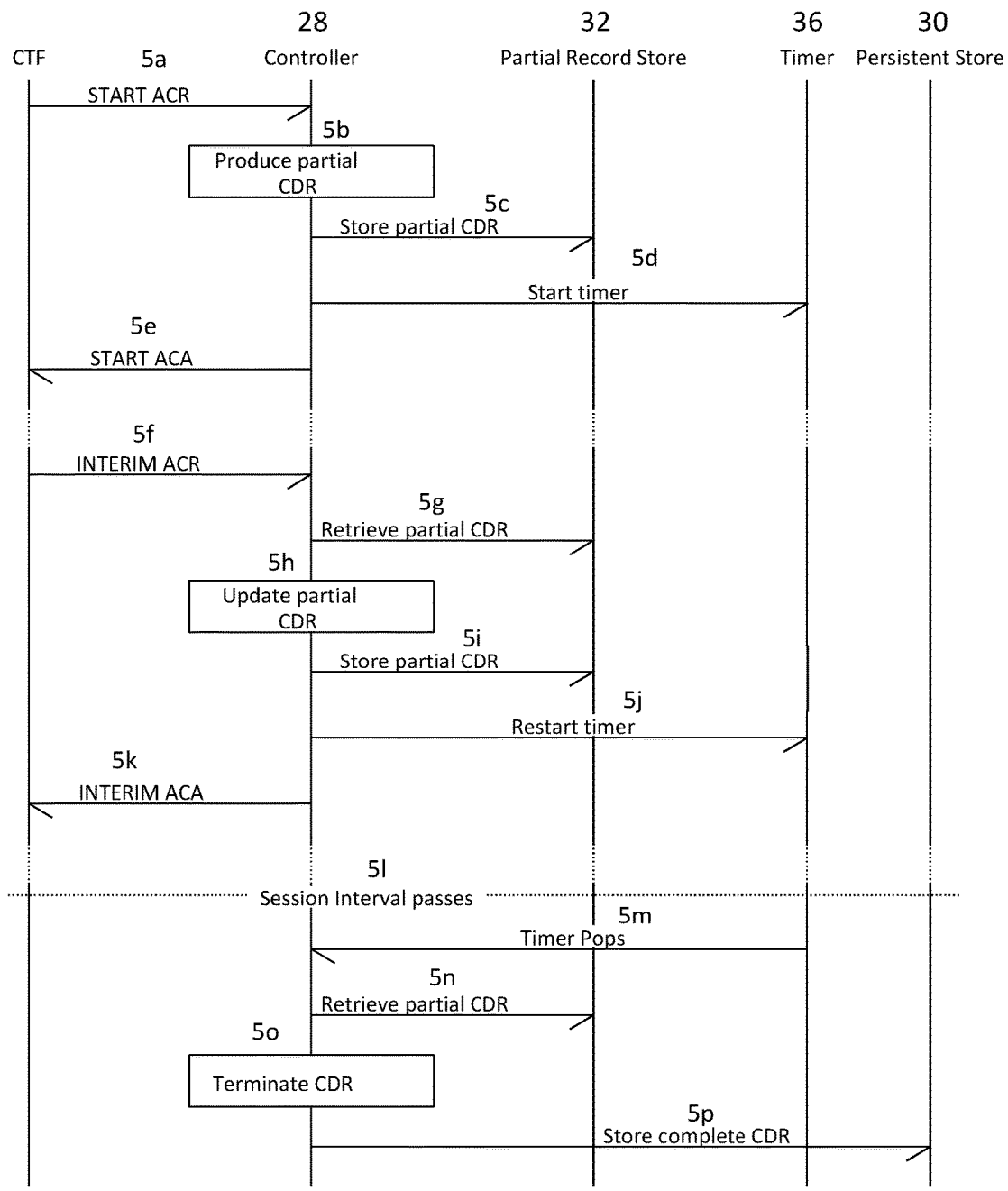
FIG. 5 shows a ladder diagram of transactions carried out to form a prematurely closed CDR for a billable session according to an embodiment.

With reference to FIG. 5, behavior of the system is described during the failure case where a heartbeat ACR is not received by a cluster. At steps 5a to 5k, the session is handled as described in FIG. 4, with a partial CDR being created based on the ACRs received up to that point. However, at 5l the Session Interval passes without an ACR being received. Shortly after this, the timer stored for this session by Timer Service 36 pops or expires. The exact timing of this in relation to the Session Interval depends on how the timer was set up and possibly any failures by the timer service causing a delay in the timer pop being communicated to the Controller 28.

The user of the system can configure the default timer as preferred, or may cause Controller 28 to dynamically generate it based on the parameters of the START ACR such as requested session interval. The session interval and timer can potentially be updated based on the parameters or source of the INTERIM ACRs. For example, if the CTF generating the ACRs is logically close in the network, a shorter timer may be used compared to a CTF housed in a different part of the network or geographically distant location. Changing the Session Interval and timer may be particularly desirable when the billing characteristics of a call change. For example, if the call is uplifted to include video media at a higher price, the session interval and timer may be reduced to minimize the potential overcharging caused by a system failure.

In any case, at 5m the Timer Service 26 indicates to Controller 28 that the timer for that session has popped or expired. This indication provides the controller with information to identify the relevant partial CDR for that session. This information may be by way of indirect lookup, but may be in the form of the diameter Session ID which is an appropriate index for storing the partial CDRs. At 5n, the controller retrieves the partial CDR from the Partial Record store, and then prematurely closes the session at 5o, terminating the CDR and finalizing it for storage with an indication that the session was prematurely closed. The terminated CDR is then stored in Persistent Store 30 at 5p.

Accordingly, the embodiments described above provide a cloud-appropriate, horizontally scalable way to implement a CDF (and, in some cases CGF) for handling incoming ACRs and producing (and storing) CDRs for billing purposes.

In some embodiments, each server 24 has its own IP address. Requests are distributed between the servers by the CTF component of each Service Element according a variant of weighted DNS load balancing. In particular, each server is assigned an arbitrary DNS weight and each CTF carries out an ordering operation (which may be simple numeric or involve hashing) on the weights returned by DNS query for the CDF hostname. Each CTF then iterates along the ordered list of IPs, sending each ACR message to the next CTF in the list. This does violate the standards for the Rf interface slightly, but it is an effective way of distributing the CDF. An alternative solution would be to have each server acting as its own load balancer. Each CTF could send ACRs to whichever IP address it had configured, and if the server found itself overloading it could simply forward the messages on within the cluster to another server.

We have considered a variety of modifications that can be made to the embodiments above and may be appropriate in alternative implementations. For example, updating the timer may be replaced by deleting and re-creating the timer. Alternatively, a new timer can be created and the original timer marked as to be ignored (either by actively adding it to a list of such timers and distributing or storing the list in a distributed store, or passively noting on receipt of a timer pop that the partial CDR for that timer has recently been updated or is finished).

The skilled man will realize that there is a potential window condition between receiving an ACR and updating the timer for the relevant session, during which one server in the cluster may be trying to update the partial CDR based on a received ACR and another may be trying to prematurely close the partial CDR based on a timer pop. Whilst in practice we expect appropriate selection of timer duration in relation to the Session Interval will render this window small enough to be acceptable, this situation can be handled by for example marking the partial CDR as it is retrieved to indicate the action being taken (update based on ACR vs. prematurely close). In this case, when a controller finds that an action is already taking place for a partial CDR, it may allow that action to complete.

However on receipt of a timer pop and in the case that the already taking place action is an update, or that on inspection of the partial CDR it finds that the record was recently updated, the existing timer will have expired and therefore should be updated or re-created as the session is ongoing.

A further modification can be made to the system as follows. Rather than removing the entry for the partial CDR from the partial record store once it seems to be finished, it can be left in but marked as finished (tombstoned). If a further ACR (or timer pop) for that session arrives, it can be compared to the tombstoned CDR. If the CDR has been prematurely closed due to failure to receive an ACR and the new message is an ACR, the partial CDR can be re-opened if appropriate, or at least updated to reflect the further message and the record of that CDR in the persistent record store removed or overwritten.

In some embodiments, each host on which a server resides also features a node of the Persistent Store 30, Clustered Store 32 and Timer 36. In such an embodiment, each controller 28 in the cluster is able to consult the co-located instance of these in order to reduce latency. However, the skilled man will realize that the nodes hosting these could easily be located on different hosts; in a different network; or in some cases replaced by non-clustered solutions such as a NAS for the store and a highly available timer in the case of the Timer service.

The skilled man will also realize that some implementations of a CDF may distribute responsibility differently between the nodes. For example, whilst controller 28 is depicted as both handling retrieval of partial CDRs and creating/updating timers, in different implementations the partial record store could create a timer itself based on receiving the partial CDR—and on the timer popping can push the partial CDR to the controller by way of notification. Such a timer might be implemented (for example) by comparing the current time to the last updated times of each record in the store, and detecting when the difference between the two reaches a threshold.

Whilst present embodiments have been described as implementing a CDF and CGF function for the purposes of billing, the skilled man will realize that the techniques described in this disclosure have broader applications in the field of telecommunications. The embodiments described above could easily be adapted to track generic notifications of events and sessions, tracking the state of some of these in a temporary store before writing them to a persistent store on completion of the event or session.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of handling incoming notifications at a cluster of servers, the notifications relating to ongoing telecommunication sessions, the method comprising:
    receiving a notification relating to an ongoing telecommunication session at a first server in the cluster;
    retrieving a session information record relevant to the ongoing telecommunication session from a first data store;
    updating the session information record to form an updated session information record, the updating taking place based on the contents of the notification;
    depositing the updated session information record in the first data store;
    determining that the time elapsed since receiving a notification relating to the ongoing telecommunications session has exceeded a timeout threshold;
    retrieving the updated session information record from the first data store;
    marking the updated session information record as prematurely completed, based on the determination, to form a closed session information record;
    depositing the closed session information record in a second data store suitable for long term storage and retrieval of the closed session information record;
    receiving a second notification relating to the ongoing telecommunication session;
    retrieving the closed session information record relevant to the ongoing telecommunication session from the first data store;
    updating the closed session information record to form a further updated session information record, the updating taking place based on the contents of the second notification; and
    depositing the further updated session information record in the first data store.

2. The method of claim 1, comprising creating a timer responsive to receiving the notification relating to an ongoing telecommunication session,
    wherein the determining that the time elapsed has exceeded a timeout threshold comprises receiving a timer pop indicating that the timer has expired.

3. The method of claim 2, wherein the timer is created in a distributed timer service.

4. The method of claim 2, wherein the timer pop is received at a second server in the cluster.

5. The method of claim 2, wherein the timer's duration is based on the expected interval between successive notifications relating to the ongoing telecommunication session.

6. The method of claim 2, wherein the timer's duration is based on a parameter of the ongoing telecommunication session.

7. The method of claim 1, comprising depositing the closed session information record in the first data store.

8. The method of claim 1, wherein the second data store is a clustered, geographically distributed data-store.

9. The method of claim 1, comprising depositing the further updated session information record in the second data store to replace the closed session information record.

10. The method of claim 1, comprising providing an FTP interface to data in the second data store.

11. The method of claim 1, wherein the incoming notifications relating to ongoing telecommunication sessions comprise diameter ACR messages for enabling charging for the ongoing telecommunication sessions.

12. The method of claim 1, wherein the session information record is a Charging Data Record (CDR).

13. A cluster of servers for handling incoming notifications relating to ongoing telecommunication sessions, the cluster of servers further comprising a first data store, each server in the cluster comprising at least one memory including computer program code and at least one processor in data communication with the at least one memory, wherein the at least one processor is configured to:
    receive a notification relating to an ongoing telecommunication session;
    retrieve a session information record relevant to the ongoing telecommunication session from the first data store;
    update the session information record to form an updated session information record based on the contents of the notification;
    deposit the updated session information record in the first data store;

determine that the time elapsed since receiving a notification relating to the ongoing telecommunications session has exceeded a timeout threshold;
retrieve the updated session information record from the first data store; and
mark the updated session information record as prematurely completed, based on the determination, to form a closed session information record;
depositing the closed session information record in a second data store suitable for long term storage and retrieval of the closed session information record;
receiving a second notification relating to the ongoing telecommunication session;
retrieving the closed session information record relevant to the ongoing telecommunication session from the first data store;
updating the closed session information record to form a further updated session information record, the updating taking place based on the contents of the second notification; and
depositing the further updated session information record in the first data store.

14. A non-transitory computer-readable storage medium comprising computer executable instructions which, when executed by a processor, cause a computing device to perform a method of handling incoming notifications at a cluster of servers, the notifications relating to ongoing telecommunication sessions, the method comprising:
receiving a notification relating to an ongoing telecommunication session at a first server in the cluster;
retrieving a session information record relevant to the ongoing telecommunication session from a first data store;
updating the session information record to form an updated session information record, the updating taking place based on the contents of the notification;
depositing the updated session information record in the first data store;
determining that a time elapsed since receiving a notification relating to the ongoing telecommunications session has exceeded a timeout threshold;
retrieving the updated session information record from the first data store;
marking the updated session information record as prematurely completed, based on the determination, to form a closed session information record;
depositing the closed session information record in a second data store suitable for long term storage and retrieval of the closed session information record;
receiving a second notification relating to the ongoing telecommunication session;
retrieving the closed session information record relevant to the ongoing telecommunication session from the first data store;
updating the closed session information record to form a further updated session information record, the updating taking place based on the contents of the second notification; and
depositing the further updated session information record in the first data store.

* * * * *